(12) United States Patent
Goecke et al.

(10) Patent No.: US 10,473,748 B2
(45) Date of Patent: Nov. 12, 2019

(54) METHOD AND SYSTEM FOR DETERMINING POSITION ACCURACY OF A MODULAR SHELVING

(71) Applicant: Walmart Apollo, LLC, Bentonville, AR (US)

(72) Inventors: Danika Goecke, Lowell, AR (US); Nicholaus A. Jones, Fayetteville, AR (US); Harika Valluripalli, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/116,623

(22) Filed: Aug. 29, 2018

(65) Prior Publication Data

US 2019/0064309 A1    Feb. 28, 2019

Related U.S. Application Data

(60) Provisional application No. 62/551,423, filed on Aug. 29, 2017.

(51) Int. Cl.
| | |
|---|---|
| *G01S 17/42* | (2006.01) |
| *G01S 3/782* | (2006.01) |
| *G01C 15/00* | (2006.01) |
| *G06Q 10/08* | (2012.01) |
| *G01S 17/46* | (2006.01) |
| *G06K 17/00* | (2006.01) |
| *G06K 19/06* | (2006.01) |

(52) U.S. Cl.
CPC ............ *G01S 3/782* (2013.01); *G01C 15/006* (2013.01); *G01S 17/42* (2013.01); *G01S 17/46* (2013.01); *G06Q 10/087* (2013.01); *G06K 19/06028* (2013.01); *G06K 2017/0045* (2013.01); *G06K 2017/0051* (2013.01)

(58) Field of Classification Search
CPC .......... G01S 3/782; G01S 17/42; G01S 17/46; G01C 15/006
USPC ........................................................ 356/138
See application file for complete search history.

(56) References Cited

U.S. PATENT DOCUMENTS

| | | |
|---|---|---|
| 5,975,416 A | 11/1999 | Chow et al. |
| 6,335,685 B1 | 1/2002 | Schrott et al. |
| 7,199,719 B2 | 4/2007 | Steinberg |

(Continued)

*Primary Examiner* — Roy M Punnoose
(74) *Attorney, Agent, or Firm* — Venable LLP; Jeffri A. Kaminski

(57) ABSTRACT

A laser beam is transmitted from a laser system to a shelving system by pointing the laser beam towards at least one label attached to the shelving system, by a computer system, using angular information of the laser beam relative to a reference frame. An angle between the laser system on the ceiling of the store to the position of the shelving system is determined by the computer system using the position of the laser system and the position of the shelving system. The laser beam is then transmitted from the laser system to the shelving system and pointed using the determined angle between the laser system on the ceiling of the store to the position of the shelving system. The laser is aimed at the x, y location where a label should be displayed, for example, according to the planogram for the store layout. If the label is not detected at the specified location, the discrepancy may be noted, for example, with a visual or other notification.

19 Claims, 3 Drawing Sheets

(56) References Cited

U.S. PATENT DOCUMENTS

| | | | |
|---|---|---|---|
| 8,262,842 B2* | 9/2012 | Szesko | G06F 19/3462 |
| | | | 156/297 |
| 8,423,431 B1* | 4/2013 | Rouaix | B65G 1/1373 |
| | | | 705/28 |
| 9,171,278 B1* | 10/2015 | Kong | G06Q 10/087 |
| 2003/0036985 A1 | 2/2003 | Soderholm | |
| 2008/0183328 A1 | 7/2008 | Danelski | |
| 2009/0179072 A1* | 7/2009 | Szesko | G06F 19/3462 |
| | | | 235/375 |
| 2011/0055103 A1* | 3/2011 | Swafford, Jr. | A47F 1/126 |
| | | | 705/345 |
| 2012/0191272 A1 | 7/2012 | Andersen et al. | |
| 2013/0107042 A1 | 5/2013 | Forster | |
| 2018/0276603 A1* | 9/2018 | Lewis | G06Q 10/087 |

* cited by examiner

METHOD AND SYSTEM FOR DETERMINING POSITION ACCURACY OF A MODULAR SHELVING

BACKGROUND

1. Technical Field

The present disclosure relates generally to modular shelving and more specifically to a method and system for determining position accuracy of a modular shelving.

2. Introduction

Shelves are often used in retail stores to display merchandise for purchase by customers. Price labels are applied to an area of the shelf below or above respective merchandise to inform customers about a price and other product information of the merchandise available for purchase. Price labels must be near the product so that the customers can associate the displayed price to the corresponding merchandise. Furthermore, the shelves are positioned within a retail space according to a certain preset configuration. The shelves are set in the retail space and the products are set in the shelves in accordance with a planogram. A planogram is a visual diagram or drawing that provides detail where every product in a retail store should be placed. A planogram is often used to place retail products on shelves in order to maximize sales. Even when using a planogram, human error occurs during the placement of the shelves and/or of the merchandise on the shelves. Conventionally, manual audits are performed by retail associates to determine accuracy of the placement the shelves and products in the retail space. However, the manual audits are time consuming and also prone to human error, especially in large retail stores selling thousands of products.

Therefore, there is a need for a novel method for determining accuracy of a modular shelving in a store or retail space. The method and system disclosed herein cure the above and other problems of existing retail shelving.

SUMMARY

An aspect of the present disclosure is to provide a method for determining position accuracy of a modular shelving. The method includes transmitting a laser beam from a laser system to a shelving system by pointing the laser beam towards at least one label attached to the shelving system, by a computer processor, using angular information of the laser beam relative to a reference frame, the at least one label being associated with at least one product displayed or to be displayed on the shelving system. The method also includes determining, by the computer processor, a measured position of the at least one label based on the angular information of the laser beam relative to the reference frame; and retrieving, by the computer processor, a reference position of the at least one label from a planogram stored in a planogram database in communication with the computer processor, the planogram including position information where each product should be located on the shelving system. The method further includes comparing, by the computer processor, the measured position of the at least one label with the reference position of the at least one label; and outputting, by the computer processor, any discrepancies between the measured position of the at least one label and the reference position of the at least one label.

Another aspect of the present disclosure is to provide a method of calibrating positions of a plurality labels on a shelving system using a laser system. The method includes recording, by a computer processor, a position of the laser system attached to a ceiling of a store relative to a reference frame in a laser position database in communication with the computer processor. The method further includes placing the shelving system on a floor of the store and recording a position of the shelving system relative to the reference frame in a shelving position database in communication with the computer processor. The method further includes attaching a first label on the shelving system, and determining, by the computer processor, an angle between the laser system on the ceiling of the store to the position of the shelving system using the position of the laser system and the position of the shelving system. The method also includes transmitting a laser beam from the laser system to the shelving system and pointing the laser beam using the determined angle between the laser system on the ceiling of the store to the position of the shelving system. The method further includes determining, by the computer processor, a position where the laser beam is pointing relative to a position of the first label on the shelving system; and moving the laser beam at increment distance until the laser beam points to the first label on the shelving system. The method also includes determining, by the computer processor, a position of the first label based on a distance the laser beam is moved; and determining, by the computer processor, a position where remaining labels are to be placed on the shelving system based on the position of the first label and a planogram stored in a planogram database, the planogram including position information where each product and associated label should be located on the shelving system.

Additional features and benefits of the disclosure will be set forth in the description which follows, and in part will be obvious from the description, or can be learned by practice of the herein disclosed principles. The features and benefits of the disclosure can be realized and obtained by means of the instruments and combinations particularly pointed out in the appended claims. These and other features of the disclosure will become more fully apparent from the following description and appended claims, or can be learned by the practice of the principles set forth herein. It is to be expressly understood, however, that the drawings are for the purpose of illustration and description only and are not intended as a definition of the limits of the disclosure.

DETAILED DESCRIPTION

Figure 1:
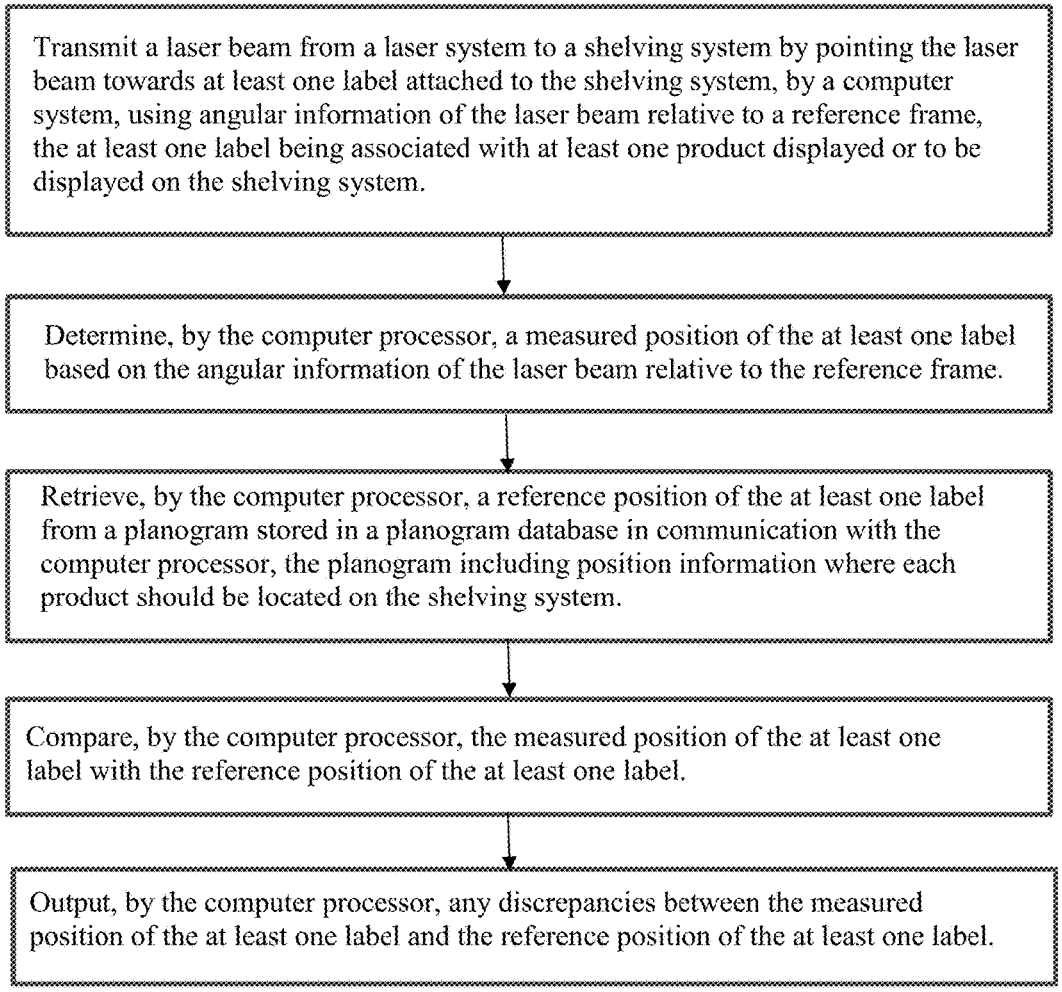
FIG. 1 is a flow diagram of a method for determining position accuracy of a modular shelving, according to an embodiment of the present disclosure.

In the present specification, the term "retail store" shall be construed to mean a store in which any variety of products may be purchased. Some examples of retail stores include, but not limited to, a brick-and-mortar store, supermarket, superstore, shopping mall, shopping plaza, grocery store, convenience market, one-stop shopping store, clothing store, service store, vending machine, kiosk, and the like. The term "product" shall be construed to mean a consumer good or service that can be sold and purchased in a retail store. The terms "product data" shall be construed to mean digital data conveying information associated with one or more products. For example, product data can include a price of a product, a product name, product description, product advertisement, product-related promotional information, and the like. For example, the product data can be in the form of a one dimensional (1D) barcode or a two dimensional (2D) barcode.

Embodiments of the system and method include transmitting a laser beam from a laser system to a shelving system by pointing the laser beam towards at least one label attached to the shelving system, by a computer system, using angular information of the laser beam relative to a reference frame. The reference frame can be, for example, defined by the walls of the store such as corners of the store or other fixed structure in the store.

An angle between the laser system on the ceiling of the store to the position of the shelving system is determined by the computer system using the position of the laser system and the position of the shelving system relative to the reference frame. In an embodiment, a control device for controlling the orientation of the laser system can be used to control the laser system to steer a laser beam from the laser system to hit the reference frame. This would calibrate the laser system and provide an initial position of reference from which any subsequent position of the laser beam can be determined. In an embodiment, this calibration can be performed once, for example after placing the laser system on the ceiling. In an embodiment, the control device for controlling the orientation of the laser system can be provided in the form of a handheld device that communicates with the laser system, for example, wirelessly to move or steer the laser beam as needed. The handheld device can be used by a store associate to steer the laser beam. The handheld device can also be used to activate the system as whole.

The laser beam is then transmitted from the laser system to the shelving system and pointed using the determined angle between the laser system on the ceiling of the store to the position of the shelving system. The laser is aimed at the x, y location where a label should be displayed, for example, according to the planogram for the store layout. If the label is not detected at the specified location, the discrepancy may be noted, for example, with a visual or other notification. The process may continue for the other locations where a label should be located.

FIG. 1 is a flow diagram of a method for determining position accuracy of a modular shelving, according to an embodiment of the present disclosure. The method includes transmitting a laser beam from a laser system to a shelving system by pointing the laser beam towards at least one label attached to the shelving system, by a computer system, using angular information of the laser beam relative to a reference frame. The at least one label is associated with at least one product displayed or to be displayed on the shelving system. In one embodiment, the at least one label contains at least a barcode. The barcode may contain product data including price of the product, product name, etc. The reference frame can be, for example, defined by the walls of the store such as corners of the store or other fixed structure in the store.

In an embodiment, prior to transmitting the laser beam, the laser system is attached to a ceiling of a store. The position of the laser system relative to the reference frame is recorded in a laser position database in communication with the computer processor. In an embodiment, prior to transmitting the laser beam, the shelving system is also placed on a floor of the store. The position of the shelving system relative to the reference frame is recorded in a shelving position database in communication with the computer processor.

In an embodiment, after placing the shelving system on the floor of the store, at least one label on is attached on the shelving system. For example, the at least one label can be attached on the top right corner of the shelving system. Although the at least one label is placed after the shelving system is placed on the floor of the store, the at least one label can also be placed on the shelving system before placing the shelving system on the floor of the store. For example, this can be done when a position of at least one label on the shelving system is known from a planogram stored in a planogram database in communication with the computer processor.

An angle between the laser system on the ceiling of the store to the position of the shelving system is determined by the computer system using the position of the laser system and the position of the shelving system. The laser beam is then transmitted from the laser system to the shelving system and aimed using the determined angle between the laser system on the ceiling of the store to the position of the shelving system.

The method further includes determining, by the computer processor, a measured position of the at least one label based on angular information of the laser beam relative to the reference frame.

The method also includes retrieving, by the computer processor, a reference position of the at least one label from the planogram stored in the planogram database in communication with the computer processor, the planogram including position information where each product should be located on the shelving system. A planogram can be a two-dimensional or three-dimensional diagram or model showing the placement of products on a fixture.

The method further includes comparing, by the computer processor, the measured position of the at least one label with the reference position of the at least one label.

The method further includes outputting, by the computer processor, any discrepancies between the measured position of the at least one label and the reference position of the at least one label.

Figure 2:
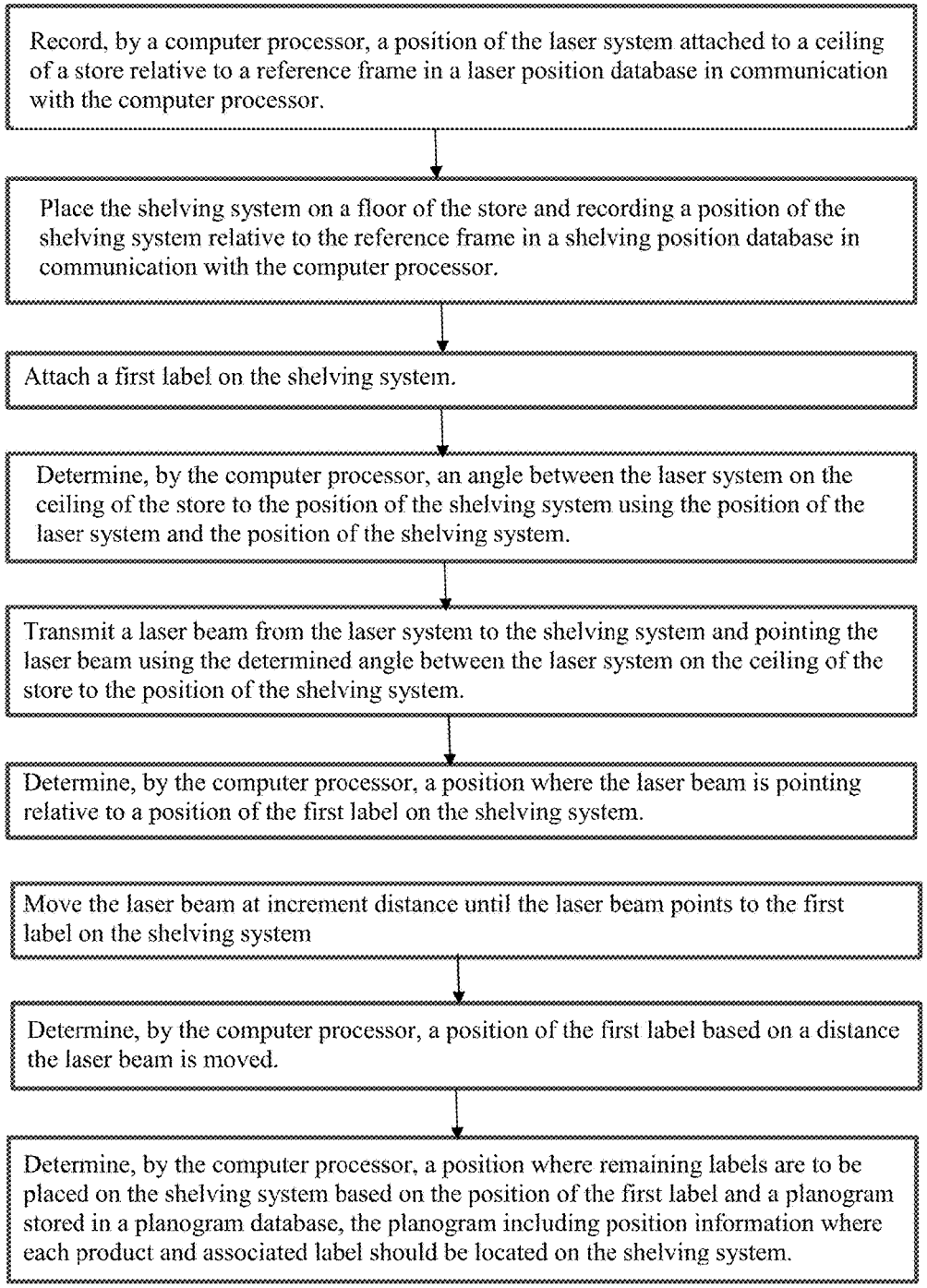
FIG. 2 is a flow diagram of another method of calibrating positions of a plurality labels on a shelving system using a laser system, according to another embodiment of the present disclosure.

FIG. 2 is a flow diagram of another method of calibrating positions of a plurality labels on a shelving system using a laser system. According to another embodiment of the present disclosure. The method includes recording a position of the laser system attached to a ceiling of a store relative to a reference frame in a laser position database in communication with a computer processor. The method may further include placing the shelving system on a floor of the store and recording a position of the shelving system relative to the reference frame in a shelving position database in communication with the computer processor.

The method may also include attaching a first label on the shelving system. The first label may be attached to the shelving system before or after the shelving system is placed on the floor of the store.

The method further includes determining, by the computer processor, an angle between the laser system on the ceiling of the store to the position of the shelving system using the position of the laser system and the position of the shelving system. In an embodiment, a shortest distance from the laser system to the shelving system traveled by the laser beam provides the 90 degrees angle reference. Using the angular information calculated from the shortest distance using cosine of the shortest distance divided by the label location, the x, y position where the laser is pointing can be determined.

The method further includes transmitting a laser beam from the laser system to the shelving system and aiming the laser beam using the determined angle between the laser system on the ceiling of the store to the position of the shelving system.

The method also includes determining, by the computer processor, a position where the laser beam is pointing relative to a position of the first label on the shelving system.

The method includes moving the laser beam at increment distance until the laser beam points to the first label on the shelving system, and determining, by the computer processor, a position of the first label based on a distance the laser beam is moved.

The method also includes determining a position where remaining labels are to be placed on the shelving system based on the position of the first label and a planogram stored in a planogram database, the planogram including position information where each product and associated label should be located on the shelving system. In an embodiment, the remaining labels are placed on the shelving system at the determined position.

In one embodiment, the computer processor retrieves a reference position of the at least one label from the planogram stored in the planogram database in communication with the computer processor. The computer processor then compares the measured position of the at least one label with the reference position of the at least one label. Any discrepancies between the measured position of the at least one label and the reference position of the at least one label are output by the computer processor. For example, the discrepancies can be displayed on a display device as red labels on the planogram.

In an embodiment, an image of the shelving system may be taken with a camera to obtain a picture of the shelving system with the plurality of labels. A current position of the plurality of labels from the picture is then compared with a proper position of the plurality of labels extracted from the planogram.

When a position of one or more labels in the plurality of labels on the shelving system does not substantially match a position of the one or more labels in the plurality of labels extracted from the planogram, the computer processor alerts a user. The alert can take the form of a sound alert or a visual alert, or both.

Figure 3:
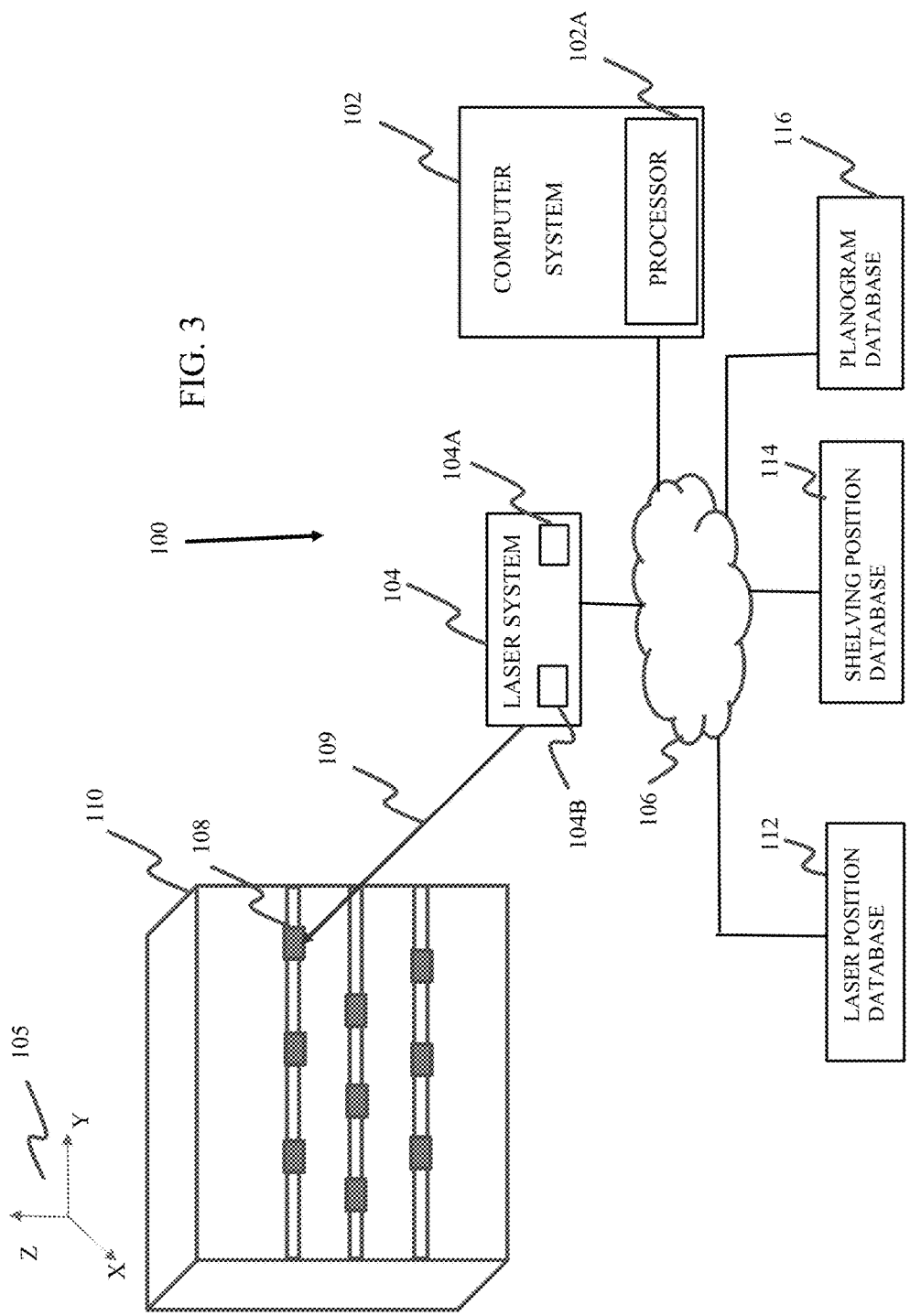
FIG. 3 illustrates an example system architecture for practicing the above methods, according to an embodiment of the present disclosure.

FIG. 3 illustrates an example system architecture 100 for practicing the above methods, according to an embodiment of the present disclosure. As shown in FIG. 3, system architecture 100 includes a computer system 102 which is directly or indirectly connected to a laser system 104. The computer system comprises one or more processors 102A configured to receive instructions to implement the above methods. The computer system 102 can communicate with the laser system 104 via communications network 106. Communications network 106 can refer to any wired, wireless, optical network, or the internet. The laser system 104 is configured to emit a laser beam 109 towards one or more labels 108 on a shelving system 110.

As illustrated in FIG. 3, laser system 104 may include a network interface 104A configured to receive instructions from the computer system 102. The instructions may include orientation and pointing of the laser beam towards the one or more labels 108. The network interface 104A can include, for example, an ethernet-type device, modem, or a WiFi device, etc. The laser beam 109 emitted by the laser system 104 can include electromagnetic radiation of visible spectrum, infrared (IR) spectrum, or ultraviolet (UV) spectrum.

The laser system 104 may include a steering module 104B configured to rotate, tilt, steer, orient, or position the laser beam 109 emitted by the laser system 104. For example, steering module 104B can include one or more servomotors or actuators, or moveable mirrors to cause the laser beam 109 to rotate, tilt, or steer in order to direct the laser beam 109 towards one or more selected electronic shelf labels 108. The steering module 104B can be also configured to cause the laser system 104 to rotate, tilt, or steer in order to direct the laser beam 109 towards one selected electronic shelf label 108.

In an embodiment, the computer system 102 can be a handheld device that is configured to communicate with the interface 104A to control the steering module 104B to steer the laser beam 109 from the laser system 104 to hit the reference frame 105. This would calibrate the laser system 104 and provide an initial position of reference from which any subsequent position of the laser beam 109 can be determined. In an embodiment, this calibration can be performed once, for example after placing the laser system 104 on the ceiling. In an embodiment, the computer system 102 operating as a handheld device (e.g., a tablet, a mobile device) can be configured to communicate with the communication interface 104A of the laser system 104 wirelessly, for example using WiFi or cellular communication. The handheld device can be used by a store associate to steer the laser beam 109. The handheld device can also be used to activate the whole system. Although, the handheld device configured to steer the laser system is described above as being the computer system 102, the handheld device for steering the laser system 104 can be separate and distinct from the computer system 102. For example, in addition to computer system 102, a separate handheld device can be provided to communicate with both the computer system 102 and the laser system 104 to control the orientation of the laser beam 109 and to update the computer system 102 regarding any change in orientation of the laser beam 109.

The computer system 102 is further configured to communicate with a laser position database 112, a shelving position database 114 and planogram database 116. The laser position database 112 is configured to store the position of the laser system 104 relative to a reference frame 105 in the store. The shelving position database 114 is configured to store a position of the shelving system 110 relative to the reference frame 105. The planogram database 116 is configured to store a planogram. The planogram may include position information where each product and associated label 108 should be located on the shelving system 110.

In an embodiment, the laser position database 112, the shelving position database 114 and the planogram database 116 can be stored or housed in separate storage devices in communication with the processor system 102. However, the laser position database 112, the shelving position database and the planogram database 116 can also be housed in a same storage device. Furthermore, the storage device(s) housing the various databases 112, 114. 116 can be located in the same location as the computer system 102 or located remote from the computer system 102.

Any of the computer system 102, the laser position database 112, the shelving database 114 and the planogram database 116 can be deployed inside or outside of retail store premises. For example, the computer system 102 can be a server computer located remotely to the retail store and it can be configured to enable users, such as product managers, to remotely control, manage, or otherwise check the position of the one or more labels 108, upload or update planograms in the planogram database 116, and the like. For these ends, the computer system 102 can perform a web service or provide an online platform, such as one available via a website.

In operation, instructions to the computer system 102 causes the laser system 104 to generate and emit the laser beam 109 and direct the laser beam 109 towards the at least one shelf label 108. The instructions can further cause steering module 104B to steer, rotate, tilt, orient, or position the laser beam 109 to be pointed towards the one or more labels 108. The computer system 102 can be programmed to execute instructions to implement the methods described in the above paragraphs.

The term "computer system" is used herein to encompass any data processing system or processing unit or units. The computer system may include one or more processors or processing units. The computer system can also be a distributed computing system. The computer system may include, for example, a desktop computer, a laptop computer, a handheld computing device such as a PDA, a tablet, a smartphone, etc. A computer program product or products may be run on the computer system to accomplish the functions or operations described in the above paragraphs. The computer program product includes a computer readable medium or storage medium or media having instructions stored thereon used to program the computer system to perform the functions or operations described above.

Examples of suitable storage medium or media include any type of disk including floppy disks, optical disks, DVDs, CD ROMs, magnetic optical disks. RAMs, EPROMs. EEPROMs, magnetic or optical cards, hard disk, flash card (e.g., a USB flash card). PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer system or processor. The software also enables the computer system or processor to interact with a user via output devices such as a graphical user interface, head mounted display (HMD), etc. The software may also include, but is not limited to, device drivers, operating systems and user applications. Alternatively, instead or in addition to implementing the methods described above as computer program product (s) (e.g., as software products) embodied in a computer, the method described above can be implemented as hardware in which for example an application specific integrated circuit (ASIC) or graphics processing unit or units (GPU) can be designed to implement the method or methods, functions or operations of the present disclosure.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network). Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Although the embodiments of disclosure have been described in detail for the purpose of illustration based on what is currently considered to be the most practical, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for calibrating positions of a plurality labels on a shelving system comprising:
   a laser system configured to emit a laser beam, the laser beam being controllable to direct the laser beam towards a first label in the plurality of labels on the shelving system;
   a laser position database storing a position of the laser system relative to a reference frame;
   a shelving position database storing a position of the shelving system relative to the reference frame;
   a planogram database storing a planogram including position information where each product and associated label should be located on the shelving system and
   a computer system comprising one or more processors configured to:
   record the position of the laser system relative to the a reference frame in the laser position database in communication with the computer processor,
   record the position of the shelving system relative to the reference frame in the shelving position database in communication with the computer processor;
   determine an angle between the laser system to the position of the shelving system using the position of the laser system and the position of the shelving system;
   point the laser beam using the determined angle between the laser system to the position of the shelving system;
   determine a position where the laser beam is pointing relative to a position of the first label on the shelving system;
   move the laser beam at increment distance until the laser beam points to the first label on the shelving system;
   determine a position of the first label based on a distance the laser beam is moved; and
   determine a position where remaining labels are to be placed on the shelving system based on the position of the first label and the planogram stored in the planogram database.

2. The system according to claim 1, wherein the laser system is attached to a ceiling of a retail store containing the shelving system.

3. A method for determining position accuracy of a modular shelving comprising:
- transmitting a laser beam from a laser system to a shelving system by aiming the laser beam towards at least one label attached to the shelving system, by a computer processor, using angular information of the laser beam relative to a reference frame, the at least one label being associated with at least one product displayed or to be displayed on the shelving system;
- determining, by the computer processor, a measured position of the at least one label based on the angular information of the laser beam relative to the reference frame;
- retrieving, by the computer processor, a reference position of the at least one label from a planogram stored in a planogram database in communication with the computer processor, the planogram including position information where each product should be located on the shelving system;
- comparing, by the computer processor, the measured position of the at least one label with the reference position of the at least one label; and
- outputting, by the computer processor, any discrepancies between the measured position of the at least one label and the reference position of the at least one label.

4. The method according to claim 3, further comprising attaching the laser system to a ceiling of a store and recording a position of the laser system relative to the reference frame in a laser position database in communication with the computer processor.

5. The method according to claim 4, further comprising placing the shelving system on a floor of the store and recording a position of the shelving system relative to the reference frame in a shelving position database in communication with the computer processor.

6. The method according to claim 5, further comprising attaching the at least one label on the shelving system.

7. The method according to claim 5, further comprising determining, by the computer processor, an angle between the laser system on the ceiling of the store to the position of the shelving system using the position of the laser system and the position of the shelving system.

8. The method according to claim 7, wherein transmitting the laser beam from the laser system to the shelving system comprises pointing the laser beam using the determined angle between the laser system on the ceiling of the store to the position of the shelving system.

9. The method according to claim 3, wherein the at least one label contains at least a barcode.

10. A method of calibrating positions of a plurality labels on a shelving system using a laser system, the method comprises:
- recording, by a computer processor, a position of the laser system attached to a ceiling of a store relative to a reference frame in a laser position database in communication with the computer processor;
- placing the shelving system on a floor of the store and recording a position of the shelving system relative to the reference frame in a shelving position database in communication with the computer processor;
- attaching a first label on the shelving system;
- determining, by the computer processor, an angle between the laser system on the ceiling of the store to the position of the shelving system using the position of the laser system and the position of the shelving system;
- transmitting a laser beam from the laser system to the shelving system and pointing the laser beam using the determined angle between the laser system on the ceiling of the store to the position of the shelving system;
- determining, by the computer processor, a position where the laser beam is pointing relative to a position of the first label on the shelving system;
- moving the laser beam at increment distance until the laser beam points to the first label on the shelving system;
- determining, by the computer processor, a position of the first label based on a distance the laser beam is moved; and
- determining, by the computer processor, a position where remaining labels are to be placed on the shelving system based on the position of the first label and a planogram stored in a planogram database, the planogram including position information where each product and associated label should be located on the shelving system.

11. The method according to claim 10, further comprising placing on the shelving system the remaining labels at the determined position.

12. The method according to claim 11, further comprising taking a picture of the shelving system with a camera to obtain a picture of the shelving system with the plurality of labels and comparing a position of the plurality of labels on the picture with a position of the plurality of labels extracted from the planogram.

13. The method according to claim 12, further comprising alerting, by the computer processor, a user when a position of one or more labels in the plurality of labels on the shelving system does not substantially match a position of the one or more labels in the plurality of labels extracted from the planogram.

14. The method according to claim 10, further comprising transmitting the laser beam from the laser system to the shelving system by pointing the laser beam towards at least one label in the plurality of labels attached to the shelving system, the at least one label being associated with at least one product displayed or to be displayed on the shelving system.

15. The method according to claim 14, further comprising determining, by the computer processor, a measured position of the at least one label based on angular information of the laser beam relative to the reference frame.

16. The method according to claim 15, further comprising retrieving, by the computer processor, a reference position of the at least one label from the planogram stored in the planogram database in communication with the computer processor.

17. The method according to claim 16, further comprising comparing, by the computer processor, the measured position of the at least one label with the reference position of the at least one label.

18. The method according to claim 17, further comprising outputting, by the computer processor, any discrepancies between the measured position of the at least one label and the reference position of the at least one label.

19. The method according to claim 10, wherein the first label contains at least a barcode.

* * * * *